(12) United States Patent
Majumdar et al.

(10) Patent No.: US 11,558,650 B2
(45) Date of Patent: Jan. 17, 2023

(54) AUTOMATED, USER-DRIVEN, AND PERSONALIZED CURATION OF SHORT-FORM MEDIA SEGMENTS

(71) Applicant: AT&T Intellectual Property I, L.P., Atlanta, GA (US)

(72) Inventors: Subhabrata Majumdar, Jersey City, NJ (US); Deirdre Paul, Morristown, NJ (US); Eric Zavesky, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/944,081

(22) Filed: Jul. 30, 2020

(65) Prior Publication Data

US 2022/0038761 A1 Feb. 3, 2022

(51) Int. Cl.
| | |
|---|---|
| H04N 21/234 | (2011.01) |
| H04N 21/2343 | (2011.01) |
| H04N 21/442 | (2011.01) |
| H04N 21/475 | (2011.01) |
| H04N 21/8549 | (2011.01) |
| H04N 21/2668 | (2011.01) |
| H04N 21/83 | (2011.01) |
| H04N 21/258 | (2011.01) |

(52) U.S. Cl.
CPC ..... *H04N 21/2668* (2013.01); *H04N 21/2343* (2013.01); *H04N 21/25891* (2013.01); *H04N 21/83* (2013.01)

(58) Field of Classification Search
CPC ......... H04N 21/25891; H04N 21/2665; H04N 21/2668
See application file for complete search history.

(56) References Cited

U.S. PATENT DOCUMENTS

| | | | |
|---|---|---|---|
| 7,996,422 B2 | 8/2011 | Shahraray et al. | |
| 8,561,103 B2 | 10/2013 | Begeja et al. | |
| 2003/0163815 A1* | 8/2003 | Begeja ............. | H04N 21/26603 725/46 |
| 2015/0074022 A1* | 3/2015 | Cornelius ............. | G06F 16/435 706/12 |
| 2015/0172787 A1* | 6/2015 | Geramifard .......... | H04N 21/252 725/40 |
| 2015/0317353 A1 | 11/2015 | Zavesky | |
| 2017/0366587 A1* | 12/2017 | Sharifi ............... | H04N 21/4826 |
| 2019/0320216 A1 | 10/2019 | Liu et al. | |

(Continued)

*Primary Examiner* — Hsiungfei Peng

(57) ABSTRACT

An example method includes obtaining a plurality of candidate media segments for possible inclusion in a single stream of media segments that is personalized for a first user, wherein at least one candidate media segment of the plurality of candidate media segments comprises an excerpt from a media asset, selecting, based on a known media consumption behavior of the first user, a subset of the plurality of candidate media segments, wherein the subset includes candidate media segments of the plurality of candidate media segments that are to be included in the single stream of media segments, modifying at least one candidate media segment in the subset based on the known media consumption behavior of the first user, and compiling the subset into the single stream of media segments, wherein the single stream of media segments includes the at least one candidate media segment in the subset that was modified.

20 Claims, 3 Drawing Sheets

(56) References Cited

U.S. PATENT DOCUMENTS

| | | |
|---|---|---|
| 2019/0384384 A1 | 12/2019 | Zavesky et al. |
| 2020/0066304 A1* | 2/2020 | Chen .................. H04N 21/2343 |
| 2020/0077142 A1* | 3/2020 | Lavie ............... H04N 21/25891 |
| 2020/0090701 A1 | 3/2020 | Xu et al. |
| 2021/0176290 A1 | 6/2021 | Zavesky et al. |
| 2021/0349883 A1 | 11/2021 | Majumdar et al. |

* cited by examiner

AUTOMATED, USER-DRIVEN, AND PERSONALIZED CURATION OF SHORT-FORM MEDIA SEGMENTS

The present disclosure relates generally to media distribution, and relates more particularly to devices, non-transitory computer-readable media, and methods for curating and compiling short-form segments of media in an automated, user-driven, and personalized manner.

BACKGROUND

Consumers (e.g., users of media content, hereinafter also referred to as simply "users") are being presented with an ever increasing number of services via which media content can be accessed and enjoyed. For instance, streaming video and audio services, video on demand services, social media, and the like are offering more forms of content (e.g., short-form, always-on, raw sensor feed, etc.) and a greater number of distribution channels (e.g., mobile channels, social media channels, streaming channels, just-in-time on-demand channels, etc.) than have ever been available in the past. As the number of choices available to users increases and diversifies, service providers seeking to retain their customer bases are looking for ways to increase the engagement of their customers with their content.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

Figure 1:
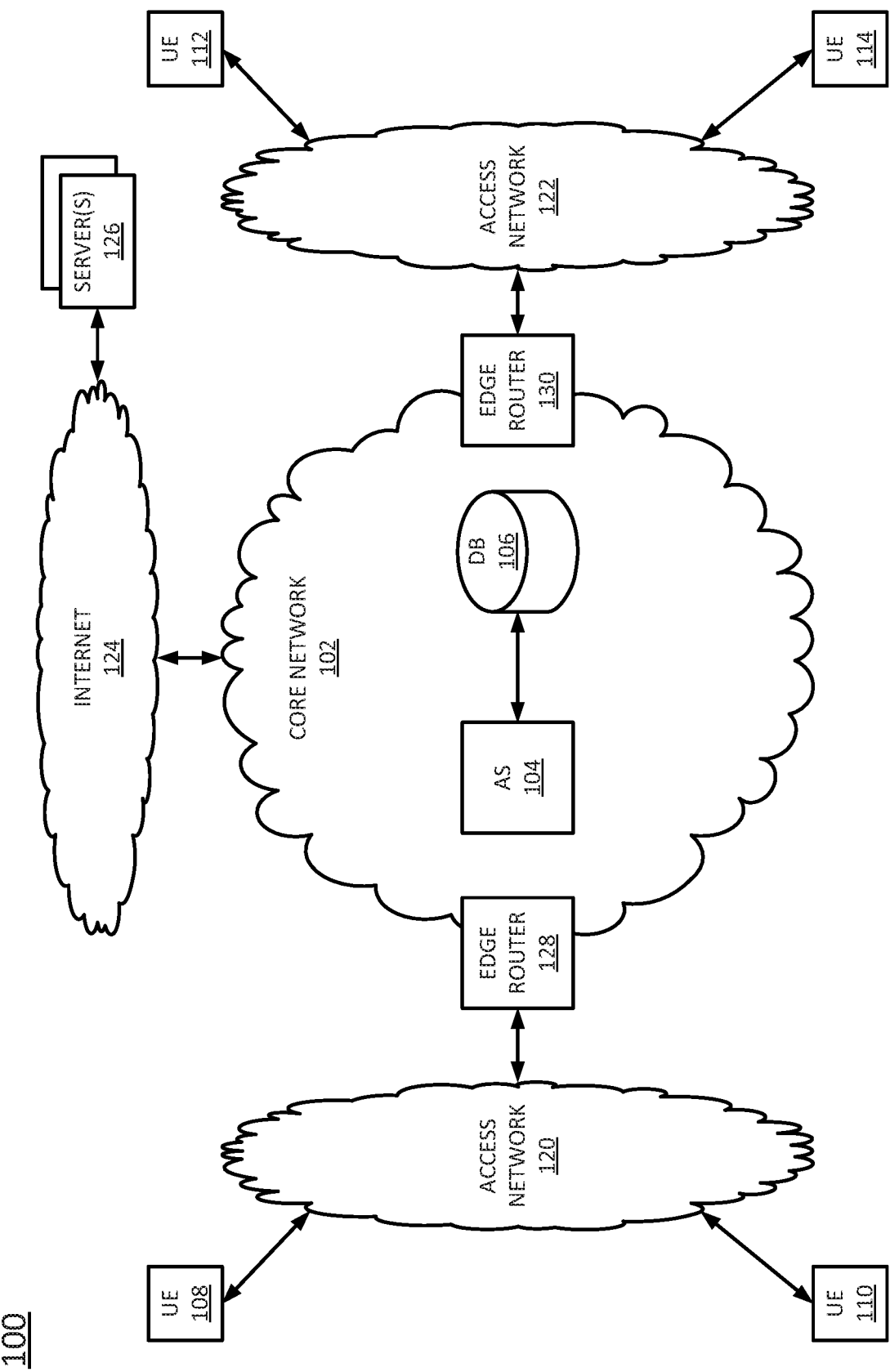
FIG. 1 illustrates an example system in which examples of the present disclosure for curating and compiling segments of media in an automated, user-driven, and personalized manner may operate.

The present disclosure broadly discloses methods, computer-readable media, and systems for curating and compiling segments of media in an automated, user-driven, personalized manner. In one example, a method performed by a processing system includes obtaining a plurality of candidate media segments for possible inclusion in a single stream of media segments that is personalized for a first user, wherein at least one candidate media segment of the plurality of candidate media segments comprises an excerpt from a media asset, selecting, based on a known media consumption behavior of the first user, a subset of the plurality of candidate media segments, wherein the subset includes candidate media segments of the plurality of candidate media segments that are to be included in the single stream of media segments, modifying at least one candidate media segment in the subset based on the known media consumption behavior of the first user, and compiling the subset into the single stream of media segments, wherein the single stream of media segments includes the at least one candidate media segment in the subset that was modified.

In another example, a non-transitory computer-readable medium may store instructions which, when executed by a processing system in a communications network, cause the processing system to perform operations. The operations may include obtaining a plurality of candidate media segments for possible inclusion in a single stream of media segments that is personalized for a first user, wherein at least one candidate media segment of the plurality of candidate media segments comprises an excerpt from a media asset, selecting, based on a known media consumption behavior of the first user, a subset of the plurality of candidate media segments, wherein the subset includes candidate media segments of the plurality of candidate media segments that are to be included in the single stream of media segments, modifying at least one candidate media segment in the subset based on the known media consumption behavior of the first user, and compiling the subset into the single stream of media segments, wherein the single stream of media segments includes the at least one candidate media segment in the subset that was modified.

In another example, a device may include a processing system including at least one processor and non-transitory computer-readable medium storing instructions which, when executed by the processing system when deployed in a communications network, cause the processing system to perform operations. The operations may include obtaining a plurality of candidate media segments for possible inclusion in a single stream of media segments that is personalized for a first user, wherein at least one candidate media segment of the plurality of candidate media segments comprises an excerpt from a media asset, selecting, based on a known media consumption behavior of the first user, a subset of the plurality of candidate media segments, wherein the subset includes candidate media segments of the plurality of candidate media segments that are to be included in the single stream of media segments, modifying at least one candidate media segment in the subset based on the known media consumption behavior of the first user, and compiling the subset into the single stream of media segments, wherein the single stream of media segments includes the at least one candidate media segment in the subset that was modified.

As discussed above, as the number of services via which users may access media content increases and diversifies, service providers seeking to retain their customer bases are looking for ways to increase the engagement of their customers with their content. One popular approach used by video distribution services has been to present viewers with sequences of curated video segments comprising the "highlights" of a program. Typically, these video segments are manually extracted by human operators (who typically determine which segments are most likely to be most interesting to viewers based on experience and/or domain knowledge), identified through analysis of video components and metadata (e.g., detecting facial expressions or crowd noise in the content which are assumed to be indicative of excitement), or identified through analysis of secondary data such as social media trends (e.g., segments being shared or discussed in social media). Although these approaches are generally successful in identifying the most popular content segments, these approaches are also costly in terms of resource usage and response latency. Moreover, due to resource and/or data constraints, only the most popular videos and the videos with the applicable metadata can be analyzed to produce curated video segments.

Moreover, the personalization of these approaches tends to be limited. That is, while these approaches may identify the content segments that are most interesting to the greatest number of viewers (or to the average viewer), these approaches are less effective when it comes to identifying the content segments that are likely to be the most interesting to a specific viewer. Even comparing the content segments to viewer demographic data or prior activity (e.g., web browsing habits, purchase history, social media activity, etc.) may not provide the level of desired personalization, since the demographic data and prior activity tend not to be context- or environment-aware. That is, the demographic data and priority activity often fail to account for the viewer's actual video consumption behaviors on the same platform, as well as the viewer's varying interest levels across the timeline of a single media asset.

Examples of the present disclosure may be used to prepare, in an automated manner, a personalized summary of a media asset or group of media assets (e.g., a personalized "highlight reel" for the media asset(s)) for a specific user (or group of users). In one example, the disclosure leverages a combination of user profile (or "persona") data elements derived from a user's content consumption history, the viewing history of other users (who may be selected to enhance personalization for the specific user), external metadata, context information for the specific user, and/or feedback from the specific user. Multiple different versions of the personalized summary may be generated based on manipulations and/or updates in different stages of the process that may be relevant to the specific user in different consumption scenarios.

In one example, the present disclosure may incorporate prior information on estimated or approximate interest levels of past users in content when determining which segments of an item of content may be of interest to the specific user. For instance, a list of video segments may be derived from interest metrics that quantify aggregate user behavior (e.g., numbers of times the past users rewound the segments, numbers of times the past users fast forwarded through the segments, numbers of repeat viewings of the segments by the past users). These metrics may assist in identifying content segments that may serve as starting points or "seeds" for discovering other content segments that may be of interest to the specific user.

In another example, user-correlated and/or user-specific information may be used to enhance personalization and contextualization of the content segments that are selected for presentation to the specific user. In this example, multiple granularities and sources may be considered, such as user-relevant metadata tags (e.g., the specific user's favorite actors, genres, programs, networks, and the like), the specific user's current consumption context (e.g., at home, in the car, on the train, etc.), the specific user's past consumption and/or social sharing patterns), a "persona" of the specific user which may be inferred from past data, a localization policy for the specific user, and/or the like. At each stage of the process for curating the content segments, feedback from the specific user may also be considered, where the feedback may comprise explicit feedback from the specific user to content segments containing the same or similar content (e.g., liked, disliked, thumbs up, thumbs down, star rating, etc.) and/or implicit feedback inferred in real time from the specific user's reaction to content segments containing the same or similar content (e.g., rewind, fast forward, and/or rewatch). In further examples, similarity measures may be used to incorporate the preferences of users who are similar to the specific user for similar content, to augment personalization for the specific user, and/or to provide a starting point for identifying content segments that may be of interest to the specific user. These similarity measures may be incorporated at various stages of the curation process, including modifying a starting point for identifying content segments, guiding human operators who may be involved in creating content segments, and/or post-processing of selected content segments.

In another example, navigation of dynamic user preferences may be possible by producing multiple versions of a personalized summary and/or multiple modes of interaction with the personalized summary for the specific user. The differences in the multiple versions may be designed to account for environmental and contextual features (which may be derived from available metadata, potentially in real time). These environmental and contextual features may include, for example, the location of the specific user (e.g., at home versus commuting to home from work), the channel and/or device on which the specific user is consuming content (e.g., mobile phone versus smart television), seasonality, day of the week, time of day, and/or the like. Push notifications, social media sharing capabilities, and the ability to explore related content may also be customized based on the specific user's environmental and contextual features. These and other aspects of the present disclosure are discussed in greater detail below in connection with the examples of FIGS. 1-3.

Within the context of the present disclosure, "user-driven" is understood to refer to the fact that the identification of the most potentially interesting segments of a media asset may be based on the manners in which users behave with respect to the media asset. For instance, for a media asset that is a video, the most potentially interesting segments may be identified as the segments that generated the greatest number of re-watches among viewers. Thus, the actual behaviors of the users with respect to the media assets may help to identify the segments of the media asset that may be most interesting to other users.

To further aid in understanding the present disclosure, FIG. 1 illustrates an example system 100 in which examples of the present disclosure for curating and compiling segments of media in an automated, personalized manner may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one application server (AS) 104, at least one database (DB) 106, and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/ Wi-Fi network and the like), cellular access networks, $3^{rd}$ party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider. The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device. For example, the user endpoint devices 108, 110, 112, and 114 may each comprise a mobile device, a cellular smart phone, a gaming console, a set top box, a laptop computer, a tablet computer, a desktop computer, an application server, a bank or cluster of such devices, and the like.

In one example, one or more servers 126 may be accessible to user endpoint devices 108, 110, 112, and 114 via Internet 124 in general. The server(s) 126 may operate in a manner similar to the AS 104, which is described in further detail below.

In accordance with the present disclosure, the AS 104 and DB 106 may be configured to provide one or more operations or functions in connection with examples of the present disclosure for curating and compiling segments of media in an automated, personalized manner, as described herein. For instance, the AS 104 may be configured to operate as a Web portal or interface via which a user endpoint device, such as any of the UEs 108, 110, 112, and/or 114, may access an application that provides personalized media streams comprising pluralities of curated and compiled media segments.

Figure 3:
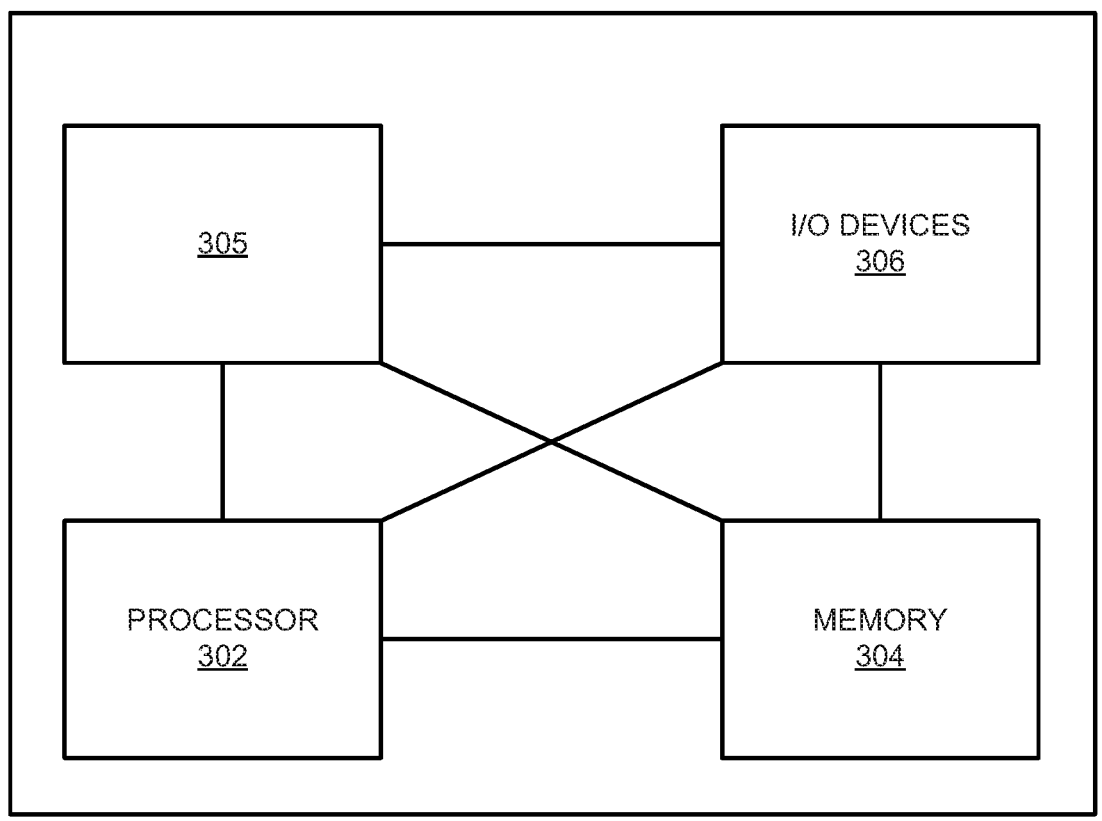
FIG. 3 illustrates an example of a computing device, or computing system, specifically programmed to perform the steps, functions, blocks, and/or operations described herein.

To this end, the AS 104 may comprise one or more physical devices, e.g., one or more computing systems or servers, such as computing system 300 depicted in FIG. 3, and may be configured as described above. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

For instance, in one example, the AS 104 may obtain a plurality of media segments that have been extracted from media assets. The AS 104 may identify, from among the plurality of media segments which media segments may or may not be candidates for inclusion in a single stream of media segments that is to be compiled for a specific user. Thus, the AS 104 may personalize the single stream of media segments for the specific user by including media segments in which the specific user is likely to be interested. In some examples, the AS 104 may further personalize the single stream of media segments by modifying at least one of the media segments (e.g., shortening the media segment, lengthening the media segment, adding data from an external source to the media segment, etc.) to better align with the interests and/or current context (location, activity, device, etc.) of the specific user. In further examples, the AS 104 may further personalize the single stream of media segments by selecting an order in which to present the media segments in the single stream of media segments to better align with the interests and/or current context of the specific user.

The AS 104 may have access to at least one database (DB) 106, where the DB 106 may store a user profile or "persona" for each user or subscriber of the service provided by the AS 104. In one example, the profile or "persona" may indicate, for the corresponding user, at least one of the following types of information: the user's name or other identifier (e.g., account number), the user's age or age range (e.g., 41, or 34-50), the user's profession and/or place of employment (e.g., student studying business at University A, marketing executive at Online Media Company B, etc.), activity contexts or activities in which the user is interested or may be engaged while a stream of media is being presented (e.g., outdoor activities, celebrity media, charity, etc.), locations contexts or locations in which the user is interested or at which the user may be while a stream if media is being presented (e.g., working, exploring, commuting), the user's preferred language and/or additional languages spoken or understood, the user's television channel preferences (e.g., preferences for specific new channels, local channels, or genre-specific channels), the user's purchasing history, the user's media consumption history (e.g., favorite television shows or radio stations), the user's social networking contacts and/or activity (e.g., types of content the user tends to post or react to), the devices used by the user while consuming media streams (e.g., mobile phone, desk top computer, etc.), the times of day at which the user typically consumes media streams (e.g., lunch time, after 9:00 PM, etc.), and/or other data.

In one example, the AS 104 may cluster activity contexts into groups of similar activity contexts and may learn labels for these groups of similar activity context. The labeled groups of similar activity contexts may then be stored as groups in the user profile or "persona." For instance, indications that the user is interested in outdoor activities (e.g., hiking, biking, rafting, etc.), action stories/genre (e.g., hero stories, underdog stories, films featuring certain actors who are known for their action roles or films in certain action franchises), survivalist stories (e.g., media about survival in nature or featuring well known survivalists), and/or the like might be grouped into an activity context of "explorer." Indications that the user is interested in leadership content (e.g., TED talks, keynotes, etc.), advertising content (e.g., marketing, online media, search optimization, etc.), celebrity media (e.g., influencers, specific public figures or celebrities, 1990s movie leads (e.g., strong personalities, leads roles, specific actors, etc.)), and/or the like may be grouped into an activity context of "executive." Indications that the user is interested in philanthropic content (e.g., TEDx, leadership councils, scholarships, etc.), philanthropic women (e.g., specific female philanthropists, equal rights, female executives, etc.), charity (e.g., charity, giving, donations, salvage, etc.) may be grouped into an activity context of "philanthropy."

In further examples, the DB 106 may store a plurality of media segments. Each media segment may comprise a portion (e.g., an entirety or less than an entirety) of a media asset. For instance, where the media asset is a video (e.g., a film, a television show, an Internet video, or the like), the media segment may comprise a single scene from the video. Where the media asset is a song, the media segment may comprise the chorus of the song. Where the media asset is a book, the media segment may comprise an excerpt (e.g., a paragraph, a scene, a chapter, etc.) of the book. Where the media asset is a podcast, the media segment may comprise an introduction of the podcast. Each media segment may be associated with a set of metadata that describes the media segment. For instance, the set of metadata associated with a media segment may indicate the type of the media asset from which the media segment was extracted (e.g., video, audio, text, image, etc.), a genre of the media segment (e.g., romantic comedy, action, sports, etc.), an emotion or sentiment of the media segment (e.g., sad, happy, funny, etc.), a duration of the media segment (e.g., x number of seconds), and/or other information about the media segment or the media asset. The metadata may be used by the AS 104, for instance, to filter candidate media segments that are available for compiling into a single stream of media segments for a specific user. For instance, media segments having metadata tags that match categories or metadata tags in a profile or "persona" for the specific user may be marked as more likely candidate for inclusion in the single stream of media segments than media segments that do not have such metadata tags. Similarly, if the specific user's profile or "persona" indicates that the specific user does not like a particular type of content, media segments having tags that match the particular type of content may be marked as less likely candidates for inclusion in the single stream of media segments.

In one example, DB 106 may comprise a physical storage device integrated with the AS 104 (e.g., a database server or a file server), or attached or coupled to the AS 104, in accordance with the present disclosure. In one example, the AS 104 may load instructions into a memory, or one or more distributed memory units, and execute the instructions for curating and compiling segments of media in an automated, personalized manner, as described herein. An example method for curating and compiling segments of media in an automated, personalized manner is described in greater detail below in connection with FIG. 2.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth. Thus, these and other modifications are all contemplated within the scope of the present disclosure.

Figure 2:
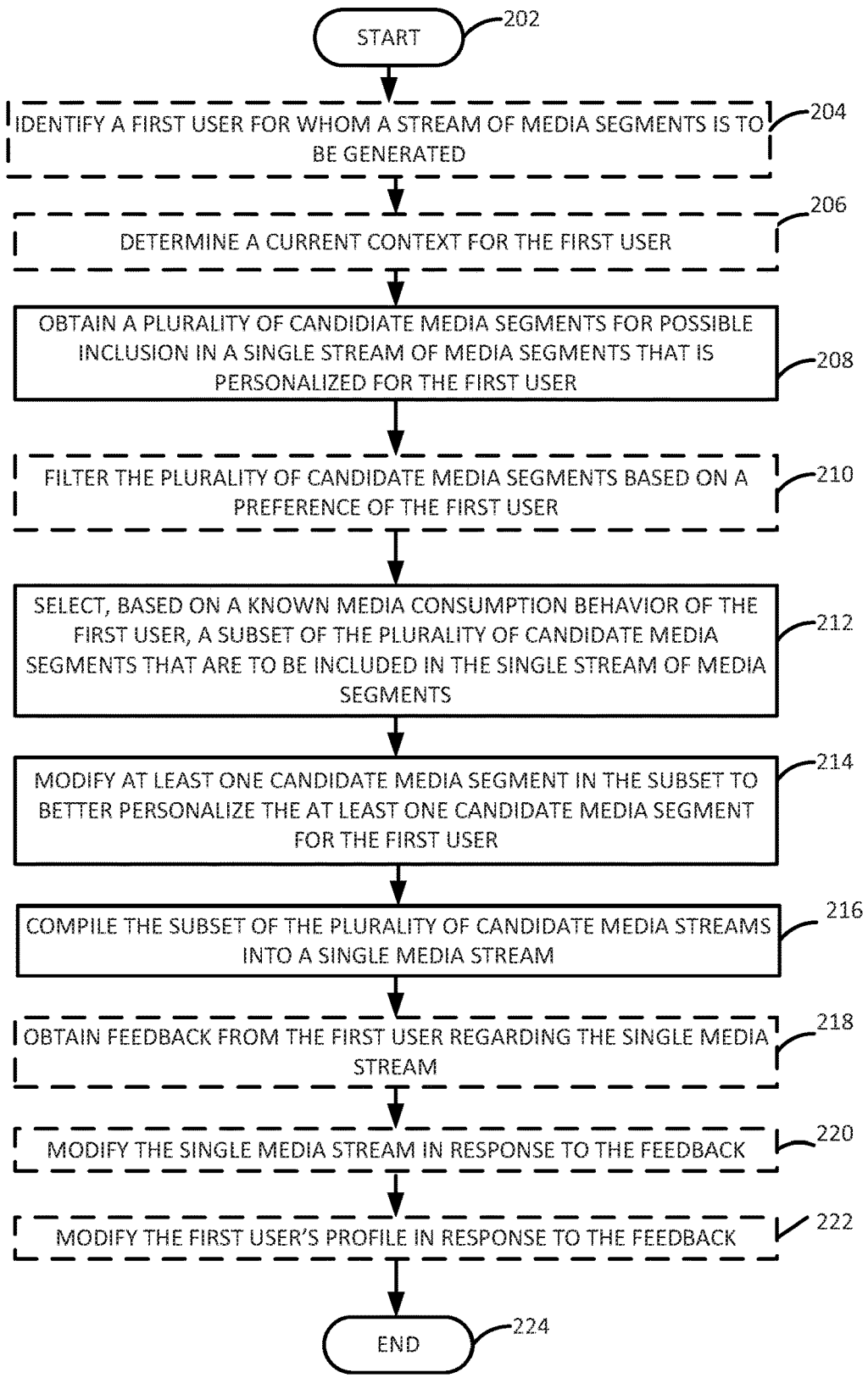
FIG. 2 illustrates a flowchart of an example method for curating and compiling segments of media in an automated, user-driven, and personalized manner, in accordance with the present disclosure.

FIG. 2 illustrates a flowchart of an automated example method 200 for compiling segments of media to produce a personalized media stream for a specific user (e.g., a "first user"), in accordance with the present disclosure. In one example, steps, functions and/or operations of the method 200 may be performed by a device as illustrated in FIG. 1, e.g., AS 104 or any one or more components thereof. In one example, the steps, functions, or operations of method 200 may be performed by a computing device or system 300, and/or a processing system 302 as described in connection with FIG. 3 below. For instance, the computing device 300 may represent at least a portion of the AS 104 in accordance with the present disclosure. For illustrative purposes, the method 200 is described in greater detail below in connection with an example performed by a processing system, such as processing system 302.

The method 200 begins in step 202 and proceeds to step 204. In optional step 204 (illustrated in phantom), the processing system may identify a first user (or group of users) for whom a stream of media segments is to be generated. In one example, the first user may be subscribed to a service that curates and compiles personalized streams of media segments for subscribers. For instance, the service may have access to a pool of media assets (e.g., images, videos, audio, text, and/or other types of media content). The service may extract segments from the media assets, and may subsequently compile segments extracted from different media assets into a single stream for presentation to subscribers.

In one example, the service may compile a single stream of media segments for a first user on-demand. For instance, the service may compile the single stream of media segments upon detecting that the first user has logged into a website for the service, or upon detecting that the first user has specifically requested compilation of a single stream of media segments. In another example, the service may compile a single stream of media segments for a first user periodically (e.g., once a day, once every x hours, etc.) or in response to the detection of a triggering event (e.g., the overall number of media assets in the pool increasing by a threshold number, the overall number of media assets in the pool increasing by a threshold number within a defined period of time, the addition to the pool of a media asset having a viewership statistics that exceed a threshold, the addition to the pool of a media asset related to a specific topic in which the first user is interested, etc.).

In optional step 206 (illustrated in phantom), the processing system may determine a current context for the first user. The current context may reflect, for example, a current location of the first user (e.g., at home, in the car, at the gym, etc.), a current activity in which the first user is engaged (e.g., browsing his or her phone, driving, exercising, etc.), the state of the first user's surrounding environment (e.g., dark, well-lit, noisy, quiet, etc.), and/or the type(s) of device(s) to which the first user currently has access (e.g., smart phone, television, IoT devices, etc.) and the device(s) capabilities (e.g., modalities, network conditions, etc.).

In one example, data from which the first user's current context can be inferred may be obtained from one or more of a plurality of sources. For instance, the first user's mobile device may provide raw data from which the current context can be inferred. As an example, the first user's smart phone may include sensors (such as a global positioning system sensor, a speedometer, an accelerometer, a thermometer, a barometer, a wind sensor, and/or the like) that can indicate the first user's current location. The sensors may also indicate the current environmental conditions in the first user's current location (e.g., temperature, weather events, daytime/nighttime, etc.), or the current environmental conditions may be obtained from another data source based on the current location (e.g., by querying a weather service application for the current location). The sensors may also indicate whether the first user is moving or remaining still, the speed at which the first user may be moving, and/or the like. The sensors may also indicate whether the smart phone is within communication range of one or more other devices (e.g., wireless headphones or speakers, IoT devices, etc.).

In step 208, the processing system may obtain a plurality of candidate media segments for possible inclusion in a single stream of media segments that is personalized for the first user. In one example, the candidate media segments may comprise segments that have already been extracted from media assets (e.g., excerpts or scenes from videos, audio, text, or the like). In one example, all of the candidate media segments may have been extracted from the same media asset; however, in other examples, the plurality of candidate media segments may include media segments extracted from at least two different media assets.

For instance, the candidate media segments may have been extracted based on viewership statistics for the media assets(s). As an example, a candidate media segment extracted from an episode of a television show may comprise a scene of the television show that was most rewatched by viewers of the television show. Thus, the scene may comprise the most salient or most potentially interesting portion of the episode (for the average viewer of the episode).

In one example, each candidate media segment may be associated with a defined set of boundaries, e.g., a start point (time stamp, frame number, or the like) and an end point (time stamp, frame number, or the like) in the media asset from which the candidate media segment was extracted. As an example, referring to the example above of the scene from the television show, the defined set of boundaries may indicate that the scene begins in frame x of the episode and ends in frame x+y of the episode.

In one example, each candidate media segment may also be associated with a set of viewership metrics that may be used for ranking candidate media segments. The set of viewership metrics may include, for example, the total or average number of times that viewers of the media asset rewound, fast forwarded, and/or re-watched the candidate media segment. This may allow a plurality of candidate media segments to be ranked (e.g., from greatest number of total re-watches to smallest number of total re-watches, or the like). The ranking may help to identify which candidate media segments were most interesting to previous users.

In another example, each candidate media segment may also be associated with a set of metadata describing the candidate media segment. The set of metadata may describe, for example, probabilistic tags across modalities (e.g., visual, audio, etc.). The set of metadata indicate a genre of the candidate media segment (e.g., sports, comedy, news, etc.), an emotion or sentiment of the candidate media segment (e.g., happy, sad, scary, etc.), an identity of an individual appearing in the candidate media segment (e.g., actor, politician, public figure, etc.), and/or other information about the content of the candidate media segment. The set of metadata may also indicate other information about the candidate media segment that is not strictly content-related, such as the length of the candidate media segment, the image resolution of the candidate media segment, the file format of the candidate media segment, and/or other information. In a further example still, the metadata may indicate information about the candidate media segment that is obtained from an external data source and/or supplied by the creator of the media asset from which the candidate media segment was extracted. For instance, if the candidate media segment comprises a scoring play from a football game, the metadata may indicate the score of the football game at the time of the candidate media segment or the final score of the football game. In another example, if the media asset from which the candidate media segment was extracted included advertisements, the metadata may indicate the locations of scene cuts for cutting to commercials.

In a further example, the set of metadata may further indicate at least one of the following types of information: the network or channel on which the candidate media segment was distributed, the part of day (e.g., morning, afternoon, or night) during which the candidate media segment was first broadcast or otherwise made available for consumption, whether the candidate media segment is a new item or a repeated item (e.g., a recording or re-rerun of a previously broadcast candidate media segment), a season number associated with the candidate media segment, a number of advertisements occurring in the candidate media segment, the products or services advertised in the advertisements, the advertisers associated with the advertisements, metadata tags (e.g., video-, audio-, and/or text-based metadata tags) indicating detected objects, recognized faces, voices, or names, scene descriptions, emotions or sentiments, silence, dialog-derived variables, or the like, publicly available metrics associated with the candidate media segment (e.g., ratings, number of user shares, user and/or critic reviews), and/or other variables provided by the producer of the candidate media segment (e.g., filming or recording locations, scene boundaries, etc.).

In optional step 210 (illustrated in phantom), the processing system may filter the plurality of candidate media segments based on a preference of the first user. In one example, the filtering may comprise removing from consideration any candidate media segments of the plurality of candidate media segments which contain content that the first user cannot or does not wish to be presented with. For instance, the first user may indicate (e.g., in a user profile or "persona" for the first user) that he or she does not want to be presented with media segments that contain offensive language or violent situations. In another example, legal considerations such as privacy, copyright, and/or decency laws may prevent a candidate media segment from being presented to the first user. For instance, a candidate media segment may comprise a scene from a television show that is only available from a streaming video service to which the first user does not subscribe. In a further example, the filtering may comprise identifying any candidate media segments of the plurality of candidate media segments that correspond to known interests of the first user (e.g., as indicated in a user profile or "persona" for the first user). For instance, if the plurality of candidate media segments includes a highlight from the first user's favorite baseball team, then the processing system may determine that the highlight should be kept for consideration for inclusion in the stream if media segments.

In step 212, the processing system may select, based on a known media consumption behavior of the first user, a subset of the plurality of candidate media segments, where the subset includes candidate media segments of the (potentially filtered) plurality of candidate media segments that are to be included in the stream of media segments for the first user. Thus, the stream of media segments may be curated and compiled for the first user based on the first user's interests and/or media consumption preferences, as inferred from the known media consumption behavior. The processing system may employ a model that allows the processing system to learn the first user's media consumption behavior (e.g., through observation of the first user's past media consumption events).

Information about the known media consumption behavior may be stored in a user profile or "persona" for the first user and may indicate, for instance, a favorite genre of the first user, a favorite film, book, podcast, or television show of the first user, a favorite musician or band of the first user, a favorite writer of the first user, a favorite actor or director of the first user, and/or the like. In one example, the first user's favorites may be inferred from observations of the first user's past viewing behaviors. For instance, if the first user has watched multiple episodes of a television show, "liked" clips of a film on a social media platform, or set a digital video recorder to record a baseball team's games, these actions may be correlated to preferences of the first user. In another example, the first user may explicitly provide information about his or her preferences or favorites (e.g., by editing his or her user profile or "persona" directly). The user profile or "persona" may evolve over time as the processing system learns more about the first user's media consumption behavior (e.g., as more data about the first user's media consumption behavior becomes available).

In one example, the plurality of candidate media segments may be ranked according to how well the plurality of candidate media segments match the known media consumption behavior. For instance, if the known media consumption behavior indicates that the first user regularly watches a first television show, then a preview for an upcoming new episode of the first television show may be ranked highly relative to other candidate media segments. Similarly, scenes from a different, second television show that was written by the same writer as the first television show may be ranked relatively highly (though perhaps not as highly as the preview for the upcoming new episode of the first television show). Scenes from a different, third television show that is very different in emotion or sentiment to the first television show may be ranked relatively low.

In one example, the selecting may also take into account the known media consumption behaviors of other users, where the known media consumption behaviors of the other users are similar to (e.g., share a threshold similarity with) the known media consumption behavior of the first user. For instance, if the first user watches a threshold number or percentage of the same television shows (e.g., x same television shows or y percent of all television shows watched) as another user, then candidate media segments that were consumed by and/or received positive feedback from the other user may be selected for inclusion in the stream of media segments for the first user. As an example, if the first user and the other user both watch the same five television shows, this may indicate that the first user and the other user have similar interests with respect to the media consumed. Thus candidate media segments that the other user enjoyed may have a higher than average likelihood of also being enjoyed by the first user.

In a further example, the selecting may take into account other information about the first user, such as the first user's location. For instance, news clips of events that happened within some threshold distance (e.g., z miles) of the first user's location (e.g., current location and/or place of residence) may be of greater interest to the first user than news clips of events that happened outside of the threshold distance.

In step 214, the processing system may modify at least one candidate media segment in the subset to better personalize the at least one candidate media segment for the first user. In one example, the modification is made to better align the content of the at least one candidate media segment with the first user's interests. For instance, the processing system may shorten the at least one candidate media segment to remove content that is not likely to be of interest to the first user or may extend the at least one candidate media segment (e.g., by incorporating more content from the source from which the at least one candidate media segment was extracted) in order to include more content that is likely to be of interest to the first user. As an example, a candidate media segment may comprise a video of the entire at bat of a baseball player, but the processing system may remove one or more pitches to shorten the candidate media segment. Thus, the duration of the candidate media segment may be adjusted to accommodate the interests and/or preferences of the first user.

In another example, the modification is made to better conform the content of the at least one candidate media segment to the presentation capabilities of a device on which the first user is expected to consume the stream of media segments. For instance, the processing system may replace an audio component of a video with closed captioning if the device doesn't have a speaker. In other examples, the modification may comprise a selection of a lower bitrate encoding of a video, when the device is not capable of display the video at a higher bitrate. In other examples, the modification may enlarge the size of text displayed in an image or video, where the device has a small display on which smaller text may be difficult to read (as might be the case with a mobile phone).

In another example, the modification is made to incorporate content related to the at least one candidate media segment that is external to (e.g., does not explicitly occur in) the at least one candidate media segment. For instance, if the at least one candidate media segment is a video, the modification may comprise including or linking additional video of the same scene, such as volumetric video, three-dimensional video, or video captured from alternate viewpoints. For instance, if the at least one candidate media segment is a video of a home run hit during a baseball game, captured from the hitter's perspective, the modification may include video of the same home run hit captured from the perspective of the pitcher, or the perspective of the location where the hit landed. The link could also link to a full version of the media asset from which the at least one candidate media segment was extracted. The external content could also include advertisements (which may be correlated by matching metadata associated with an advertisement to metadata associated with the at least one candidate media segment, or by a specific sponsor's advertisement being matched, ahead of time, to the at least one candidate media segment) or links to e-commerce websites where items depicted in the at least one candidate media segment can be purchased.

In step 216, the processing system may compile the subset of the plurality of candidate media segments into a single stream of media segments, e.g., a single continuous media (e.g., in which the subset of the plurality of candidate media segments may play one after the other in an automatic manner). For instance, the stream of events may comprise a continuous sequence of video clips, audio clips, or the like. For instance, in one example, the individual media segments in the subset may be concatenated in a sequence. The sequence in which the individual media segments in the subset are presented may also be tuned to the preferences of the first user and/or the device capabilities of the device used by the first user. For instance, the individual media segments may be presented in order of highest ranking media segment to lowest ranking media segment (e.g., based on the rankings determined in step 212), so that the media segments that are believed to be of greatest interest to the first user are presented first. In one example, breaks or advertisements may be inserted between the individual media segments in the single stream of media segments. The single stream of media segments may be stored in a location where it can be accessed by the first user when the first user is ready to consume the single stream of media segments.

In optional step 218 (illustrated in phantom), the processing system may obtain feedback from the first user regarding the single stream of media segments. In one example, the feedback may comprise explicit feedback. For instance, the first user may "like" or "dislike" the single stream of media segments (e.g., by selecting a "like" or "dislike" or a "thumbs up" or "thumbs down" button), may provide a rating for the single stream of media segments (e.g., on a scale of one to ten, or a scale of one to five stars, etc.), may recommend the single stream of media segments to a second user, may bookmark the single stream of media segments, may select an option to explore content presented in the single stream of media segments further (e.g., via a hyperlink), or the like. In another example, the feedback may comprise implicit feedback. For instance, whether the first user consumed the entire single stream of media segments or tuned away from the single stream of media segments partway through may indicate how interested the first user was in the single stream of media segments or in a specific portion of the single stream of media segments.

In optional step 220 (illustrated in phantom), the processing system may modify the single stream of media segments in real time (e.g., as the first user is consuming the single stream of media segments) in response to the feedback. For instance, the presentation of the single stream of media segments may skip portions of the single stream of media segments that do not appear to interest the first user or may replace these portions of the single stream of media segments with new content. Alternatively, the presentation of the single stream of media segments may expand or enhance a portion of the media stream in which the first user appears to be interested (e.g., by presenting opportunities to explore the portions further, by presenting relevant external information, and/or the like).

In optional step 222 (illustrated in phantom), the processing system may modify the first user's user profile or "persona" based on the feedback. Modifying the user profile or "persona" may allow the processing system to better personalize future streams of media for the first user (e.g., to better identify media segments that are likely or unlikely to be of interest to the first user, to better modify media segments to accommodate the first user's preferences or device capabilities, etc.).

The method 200 may end in step 224.

Examples of the present disclosure therefore provide a personalized summary of a media asset or group of media assets (e.g., a personalized "highlight reel" for the media asset(s)) for a specific user (or group of users). In one example, the disclosure leverages a combination of user profile (or "persona") data elements derived from a user's content consumption history, the viewing history of other users (who may be selected to enhance personalization for the specific user), external metadata, context information for the specific user, and/or feedback from the specific user. Multiple different versions of the personalized summary may be generated based on manipulations and/or updates in different stages of the process that may be relevant to the specific user in different consumption scenarios.

An advantage of the present disclosure is that the single stream of media segments that is compiled for a user can be personalized in a variety of ways for that user. For instance, the individual media segments that are compiled into the single stream of media segments may be selected based on the user's preferences and/or context. However, the individual media segments may also be further personalized based on the user's preferences and/or context (e.g., media segments may be shortened, lengthened, or otherwise edited or modified as necessary). Thus, for example, if the user is currently engaged in an activity where he or she cannot watch a screen (e.g., the user is driving, running, or the like), the single stream may present only the audio portions of the individual media segments, even though the individual media segments may also include video portions.

In further examples, different personalization options may be evaluated by offering the different personalization options to randomly selected groups of users who share a persona (or whose personas share some threshold similarity, such as at least x of the same interests). The feedback obtained from the users in a group may be evaluated (e.g., according to steps 218-222 described above) in order to rank the personalization options based on which of the personalization options were most appealing to the group (and, by extension, to personas of certain types or having certain interests). Then, users who were not members of the group, but who share the same persona (or whose personas share a threshold similarity with the group persona) may be presented with the personalization options that were ranked most highly. Thus, examples of the present disclosure may employ models that learn interests for users who are determined to fall into a particular user group.

It should be noted that the method 200 may be expanded to include additional steps or may be modified to include additional operations with respect to the steps outlined above. In addition, although not specifically specified, one or more steps, functions, or operations of the method 200 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

FIG. 3 depicts a high-level block diagram of a computing device or processing system specifically programmed to perform the functions described herein. As depicted in FIG. 3, the processing system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for curating and compiling segments of media in an automated, personalized manner, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200 or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 305 for curating and compiling segments of media in an automated, personalized manner (e.g., a software program comprising computer-executable instructions) can be loaded into memory 304 and executed by hardware processor element 302 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for curating and compiling segments of media in an automated, personalized manner (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
obtaining, by a processing system including at least one processor, a plurality of candidate media segments for possible inclusion in a single stream of media segments that is personalized for a first user, wherein at least one candidate media segment of the plurality of candidate media segments comprises an excerpt from a media asset;
selecting, by the processing system and based on a known media consumption behavior of the first user, a subset of the plurality of candidate media segments, wherein the subset includes candidate media segments of the plurality of candidate media segments that are to be included in the single stream of media segments;
determining, by the processing system, a context under which the first user is expected to consume the single stream of media segments, wherein the context under which the first user is expected to consume the single stream of media segments reflects a current activity in which the first user is engaged, and wherein the current activity affects an ability of the first user to watch a screen;
modifying, by the processing system, at least one candidate media segment in the subset based on the known media consumption behavior of the first user and on the context under which the first user is expected to consume the single stream of media segments, wherein the modifying comprises at least one of: lengthening the at least one candidate media segment, shortening the at least one candidate media segment, or presenting only an audio portion of the at least one candidate media segment, to facilitate consumption of the at least one candidate media segment by the first user while the first user is engaged in the current activity, wherein the modifying further comprises incorporating into the single stream of media segments, content related to the at least one candidate media segment, wherein the content is external to the at least one candidate media segment, wherein metadata associated with the content matches metadata associated with the at least one candidate media segment, and wherein the at least one candidate media segment comprises a video of an event captured from a first perspective, and the content related to the at least one candidate media segment comprises a video of the event captured from a second perspective that is different from the first perspective; and compiling, by the processing system, the subset into the single stream of media segments, wherein the single stream of media segments includes the at least one candidate media segment in the subset that was modified.

2. The method of claim 1, wherein the single stream of media segments presents the subset of the plurality of candidate media segments, including the at least one candidate media segment in the subset that was modified, one after another in a continuous manner.

3. The method of claim 1, wherein the context under which the first user is expected to consume the single stream of media segments further reflects at least one of: a current location of the first user, a state of an environment surrounding the first user, a type of device to which the first user currently has access, or a capability of the device to which the first user currently has access.

4. The method of claim 3, wherein the selecting is further based on the context under which the first user is expected to consume the single stream of media segments.

5. The method of claim 1, wherein the media asset comprises at least one of: an image, a video, an audio, or a text.

6. The method of claim 5, wherein the at least one candidate media segment of the plurality of candidate media segments comprises a portion of the media asset that was extracted from the media asset based on a viewership statistic of the portion.

7. The method of claim 1, wherein each candidate media segment of the plurality of candidate media segments is associated with a set of metadata that describes at least one of: a genre of the each candidate media segment, a sentiment of the each candidate media segment, an identity of an individual appearing in the each candidate media segment, a length of the each candidate media segment, an image resolution of the each candidate media segment, a file format of the each candidate media segment, or data about the each candidate media segment that is obtained from an external source.

8. The method of claim 7, wherein the selecting comprises:

filtering, by the processing system, the plurality of candidate media segments based on a preference of the first user, wherein the preference of the first user is specified in a profile for the first user; and ranking, by the processing system, the subset based on the known media consumption behavior.

9. The method of claim 8, wherein the filtering comprises:

removing, by the processing system, from the plurality of candidate media segments, a first candidate media segment when the set of metadata associated with the first candidate media segment indicates that the first candidate media segment includes content that the preference indicates the first user does not wish to be presented with.

10. The method of claim 8, wherein the filtering comprises:

keeping, by the processing system for consideration for inclusion in the subset, a first candidate media segment of the plurality of candidate media segments when the set of metadata associated with the first candidate media segment indicates that the first candidate media segment includes content that the preference indicates the first user is interested in.

11. The method of claim 1, wherein the known media consumption behavior is inferred from observations of past media consumption behaviors of the first user.

12. The method of claim 1, wherein the known media consumption behavior is provided explicitly by the first user.

13. The method of claim 1, wherein the selecting is further based on a known viewing behavior of a second user, wherein the known viewing behavior of the second user shares a threshold similarity with the known viewing behavior of the first user.

14. The method of claim 1, wherein the modifying further comprises:

modifying, by the processing system, the at least one candidate media segment in the subset to conform to a capability of a device on which the first user is expected to consume the single stream of media segments.

15. The method of claim 1, wherein the compiling comprises arranging the subset in an order in the single stream of media segments, and wherein the order is selected based on the known media consumption behavior of the first user.

16. The method of claim 1, further comprising:

obtaining, by the processing system, feedback from the first user regarding the single stream of media segments; and modifying, by the processing system, the single stream of media segments in response to the feedback, wherein the modifying is performed as the first user is consuming the single stream of media segments.

17. A non-transitory computer-readable medium storing instructions which, when executed by a processing system including at least one processor, cause the processing system to perform operations, the operations comprising:

obtaining a plurality of candidate media segments for possible inclusion in a single stream of media segments that is personalized for a first user, wherein at least one candidate media segment of the plurality of candidate media segments comprises an excerpt from a media asset;

selecting, based on a known media consumption behavior of the first user, a subset of the plurality of candidate media segments, wherein the subset includes candidate media segments of the plurality of candidate media segments that are to be included in the single stream of media segments;

determining a context under which the first user is expected to consume the single stream of media segments, wherein the context under which the first user is expected to consume the single stream of media segments reflects a current activity in which the first user is engaged, and wherein the current activity affects an ability of the first user to watch a screen;

modifying, at least one candidate media segment in the subset based on the known media consumption behavior of the first user and on the context under which the first user is expected to consume the single stream of media segments, wherein the modifying comprises at least one of: lengthening the at least one candidate media segment, shortening the at least one candidate media segment, or presenting only an audio portion of the at least one candidate media segment, to facilitate consumption of the at least one candidate media segment by the first user while the first user is engaged in the current activity, wherein the modifying further comprises incorporating into the single stream of media segments, content related to the at least one candidate media segment, wherein the content is external to the at least one candidate media segment, wherein metadata associated with the content matches metadata associated with the at least one candidate media segment, and wherein the at least one candidate media segment comprises a video of an event captured from a first perspective, and the content related to the at least one candidate media segment comprises a video of the event captured from a second perspective that is different from the first perspective; and compiling the subset into the single stream of media segments, wherein the single stream of media segments includes the at least one candidate media segment in the subset that was modified.

18. The non-transitory computer-readable medium of claim 17, wherein the single stream of media segments presents the subset of the plurality of candidate media segments, including the at least one candidate media segment in the subset that was modified, one after another in a continuous manner.

19. The non-transitory computer-readable medium of claim 17, wherein the media asset comprises at least one of: an image, a video, an audio, or a text.

20. A device comprising:
a processing system including at least one processor; and
a non-transitory computer-readable medium storing instructions which, when executed by the processing system, cause the processing system to perform operations, the operations comprising:
obtaining a plurality of candidate media segments for possible inclusion in a single stream of media segments that is personalized for a first user, wherein at least one candidate media segment of the plurality of candidate media segments comprises an excerpt from a media asset;

selecting, based on a known media consumption behavior of the first user, a subset of the plurality of candidate media segments, wherein the subset includes candidate media segments of the plurality of candidate media segments that are to be included in the single stream of media segments;

determining a context under which the first user is expected to consume the single stream of media segments, wherein the context under which the first user is expected to consume the single stream of media segments reflects a current activity in which the first user is engaged, and wherein the current activity affects an ability of the first user to watch a screen;

modifying, at least one candidate media segment in the subset based on the known media consumption behavior of the first user and on the context under which the first user is expected to consume the single stream of media segments, wherein the modifying comprises at least one of: lengthening the at least one candidate media segment, shortening the at least one candidate media segment, or presenting only an audio portion of the at least one candidate media segment, to facilitate consumption of the at least one candidate media segment by the first user while the first user is engaged in the current activity, wherein the modifying further comprises incorporating into the single stream of media segments, content related to the at least one candidate media segment, wherein the content is external to the at least one candidate media segment, wherein metadata associated with the content matches metadata associated with the at least one candidate media segment, and wherein the at least one candidate media segment comprises a video of an event captured from a first perspective, and the content related to the at least one candidate media segment comprises a video of the event captured from a second perspective that is different from the first perspective; and compiling the subset into the single stream of media segments, wherein the single stream of media segments includes the at least one candidate media segment in the subset that was modified.

* * * * *